United States Patent
Yoon

(10) Patent No.: US 10,384,666 B2
(45) Date of Patent: Aug. 20, 2019

(54) SHIFT CONTROL METHOD FOR HYBRID VEHICLE WITH DCT

(71) Applicants: HYUNDAI MOTOR COMPANY, Seoul (KR); KIA MOTORS CORPORATION, Seoul (KR)

(72) Inventor: Young Min Yoon, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/808,397

(22) Filed: Nov. 9, 2017

(65) Prior Publication Data

US 2018/0312156 A1    Nov. 1, 2018

(30) Foreign Application Priority Data

May 1, 2017    (KR) .................. 10-2017-0055860

(51) Int. Cl.
*B60W 10/113*    (2012.01)
*B60W 20/10*    (2016.01)
(Continued)

(52) U.S. Cl.
CPC .............. *B60W 20/10* (2013.01); *B60K 6/48* (2013.01); *B60W 10/02* (2013.01); *B60W 10/06* (2013.01); *B60W 10/08* (2013.01); *B60W 10/113* (2013.01); *B60K 6/36* (2013.01); *B60K 6/547* (2013.01); *B60K 2006/4825* (2013.01); *B60W 2510/0291* (2013.01); *B60W 2540/10* (2013.01); *B60W 2710/021* (2013.01); *B60W 2710/027* (2013.01); *B60W 2710/0666* (2013.01); *B60W 2710/0672* (2013.01); *B60W 2710/083* (2013.01); *B60W 2710/085* (2013.01); *B60W 2710/1005* (2013.01); *B60Y 2200/92* (2013.01); *F16H 3/006* (2013.01); *Y10S 903/909* (2013.01);
(Continued)

(58) Field of Classification Search
None
See application file for complete search history.

(56) References Cited

U.S. PATENT DOCUMENTS

2013/0231833 A1* 9/2013 Burtch ............... B60W 10/02
                                                                701/67
2015/0167756 A1* 6/2015 Yoon ..................... F16D 48/06
                                                                701/68
(Continued)

FOREIGN PATENT DOCUMENTS

JP    4621969 B2    2/2011
JP    4921509 B2    4/2012
KR    10-1198791 B1    11/2012

*Primary Examiner* — Justin Holmes
(74) *Attorney, Agent, or Firm* — Brinks Gilson & Lione

(57) ABSTRACT

Disclosed herein is a technique for improving drivability of a vehicle by controlling the driving of the vehicle by a double clutch when the clutch of a double clutch transmission (DCT) is overheated. There is provided a shift control method for a hybrid vehicle with a DCT. In particular, where it is desired to perform shifting when one of clutches of the DCT is overheated, double-clutch shifting is performed using a non-overheated clutch and an engine clutch without using the overheated clutch, thereby reducing disharmonic shifting in virtue of a small difference in gear ratio during shifting and improving shifting and driving performance.

6 Claims, 4 Drawing Sheets

(51) Int. Cl.
  *B60W 10/02* (2006.01)
  *B60W 10/06* (2006.01)
  *B60W 10/08* (2006.01)
  *B60K 6/48* (2007.10)
  B60K 6/547 (2007.10)
  B60K 6/36 (2007.10)
  *F16H 3/00* (2006.01)
(52) U.S. Cl.
  CPC .......... *Y10S 903/919* (2013.01); *Y10S 903/93* (2013.01); *Y10S 903/945* (2013.01); *Y10S 903/946* (2013.01)

(56) References Cited

U.S. PATENT DOCUMENTS

| | | | |
|---|---|---|---|
| 2017/0009823 A1* | 1/2017 | Cho | F16D 48/06 |
| 2017/0166182 A1* | 6/2017 | Kim | B60W 10/02 |
| 2018/0170359 A1* | 6/2018 | Kim | B60W 20/40 |

\* cited by examiner

SHIFT CONTROL METHOD FOR HYBRID VEHICLE WITH DCT

CROSS REFERENCE TO RELATED APPLICATION

This application claims priority to and the benefit of Korean Patent Application No. 10-2017-0055860, filed on May 1, 2017, which is incorporated herein by reference in its entirety.

FIELD

The present disclosure relates to a shift control method for a hybrid vehicle with a dual clutch transmission (DCT) to improve drivability of a vehicle.

BACKGROUND

The statements in this section merely provide background information related to the present disclosure and may not constitute prior art.

Since a DCT transmits an engine torque using a dry clutch unlike a typical automatic transmission that uses a torque converter and a wet multiple disk clutch, it is difficult for the DCT to be cooled by air during heating caused by clutch slip.

Hence, when the temperature of the DCT is increased, the DCT may not efficiently transmit power due to the considerably undermined friction performance of friction materials. Under this condition, the clutch of the DCT is worn out easily (i.e., fade-out) when the clutch slip continues to occur so that malfunction of the clutch may occur.

In the related art, a called limp-home control has been used to protect the clutch from being overheated. In the limp-home mode, the temperature of the clutch is estimated to determine the overheating of the clutch. When the clutch is determined to be overheated, "odd to odd" or "even to even" driving control, namely single clutch driving, is performed. The single clutch driving does not control a shift stage in an input shaft provided with the overheated clutch.

However, we have discovered that, in the driving mode under the limp-home control, the single clutch driving brings a large power disconnection due to a large gear ratio shift during shifting to high or low stages, such that the driving performance by the single clutch driving is far below than the driving performance provided with the double clutch driving in which shifting is performed by using two clutches together. We have further discovered that the single clutch driving may not provide a reverse drive during the odd to odd shifting.

SUMMARY

The present disclosure proposes a shift control method for a hybrid vehicle equipped with a DCT so as to improve vehicle drivability of a vehicle by normally controlling the driving of the vehicle by means of a double clutch rather than a single clutch even when the clutch of a DCT overheats.

In an aspect of the present disclosure, a shift control method for a hybrid vehicle having a DCT may include steps of: estimating, by a controller, respective temperatures of first and second clutches of a DCT to detect an overheated clutch among the first and second clutches; controlling, by the controller, an engine clutch to be disengaged when one of the first and second clutches is overheated and when a shift command for shifting from a shift stage associated to the overheated clutch to an another shift stage associated to a non-overheated clutch is received by the controller; controlling, by the controller, a shift gear to be disengaged when a current shift stage formed by the shift gear is associated with the overheated clutch; and controlling, by the controller, the non-overheated clutch to be engaged while the engine clutch is engaged.

The overheated clutch may be controlled to be maintained in an engaged state after the step of controlling the engine clutch.

In the step of controlling the non-overheated clutch, an increasing gradient of torque of the engine clutch may be controlled to be larger than an increasing gradient of the non-overheated clutch.

The shift command may be a power-on upshift command or a power-on downshift command for shifting to a high stage or a low stage by pressing an accelerator pedal, a drive torque of a drive source may be limited in the step of controlling the engine clutch, and the limitation of the drive torque of the drive source may be controlled to be released in the step of controlling the non-overheated clutch, so that the drive torque is increased.

In the step of controlling the non-overheated clutch, an increasing gradient of the drive torque may be controlled to be equal to or smaller than an increasing gradient of torque of the non-overheated clutch in a power-on upshift.

The step of controlling the non-overheated clutch may include: controlling an initial increasing gradient of the drive torque to be greater than an increasing gradient of torque of the non-overheated clutch and to be equal to or smaller than an increasing gradient of torque of the engine clutch in a power-on downshift, and controlling the increasing gradient of the drive torque to follow the increasing gradient of torque of the non-overheated clutch after the controlling the initial increasing gradient of the drive torque.

As apparent from the above description, in the case where it is desired to perform shifting in the state in which one of two clutches of the DCT is overheated, double-clutch shifting is performed using a non-overheated clutch and an engine clutch without using the overheated clutch, thereby reducing disharmonic shifting in virtue of a small difference in gear ratio during shifting. Therefore, the present disclosure has an effect of improving shifting and driving performance and is advantageous in that reversing is possible even when an even-side clutch is overheated for torque transfer to a reverse gear. Further, areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
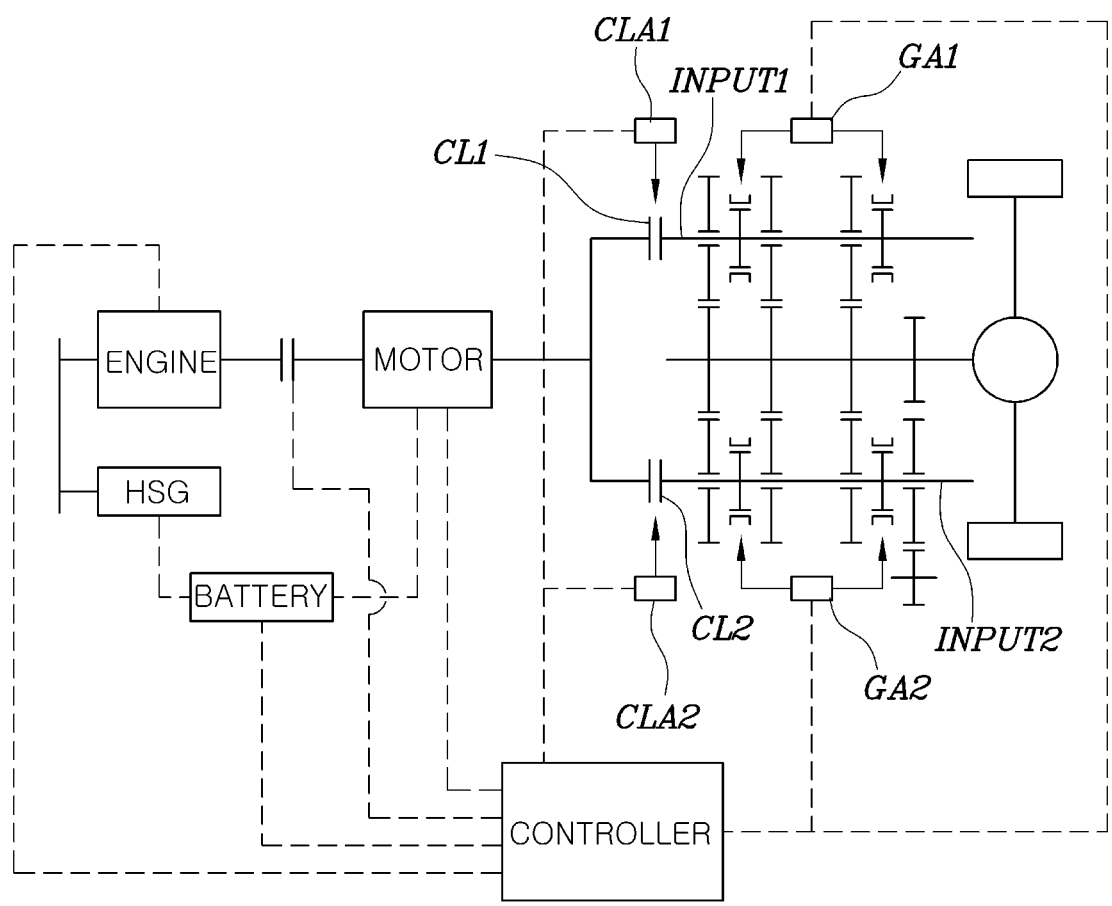
FIG. 1 is a diagram illustrating a structure of a power train of a hybrid vehicle with a DCT, which is applicable to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As illustrated in FIG. 1, the present disclosure is applicable to a hybrid vehicle having a DCT.

Referring to FIG. 1, the vehicle having a DCT may include: an odd-side clutch CL1 and an even-side clutch CL2 of the DCT; an odd-side clutch actuator CLA1 and an even-side clutch actuator CLA2 for engaging and disengaging the clutches; an input shaft INPUT 1 provided with the odd-side clutch; and an input shaft INPUT 2 provided with the even-side clutch.

In addition, the vehicle may further include: an odd-side gear actuator for engaging and disengaging odd gears, and an even-side gear actuator for engaging and disengaging even gears, which are respectively designated by reference numerals GA1 and GA2.

A shift control method for a hybrid vehicle with a DCT in one form of the present disclosure may include an overheated clutch detection step, an engine clutch disengagement step, a gear disengagement step, and a clutch engagement step.

Figure 2:
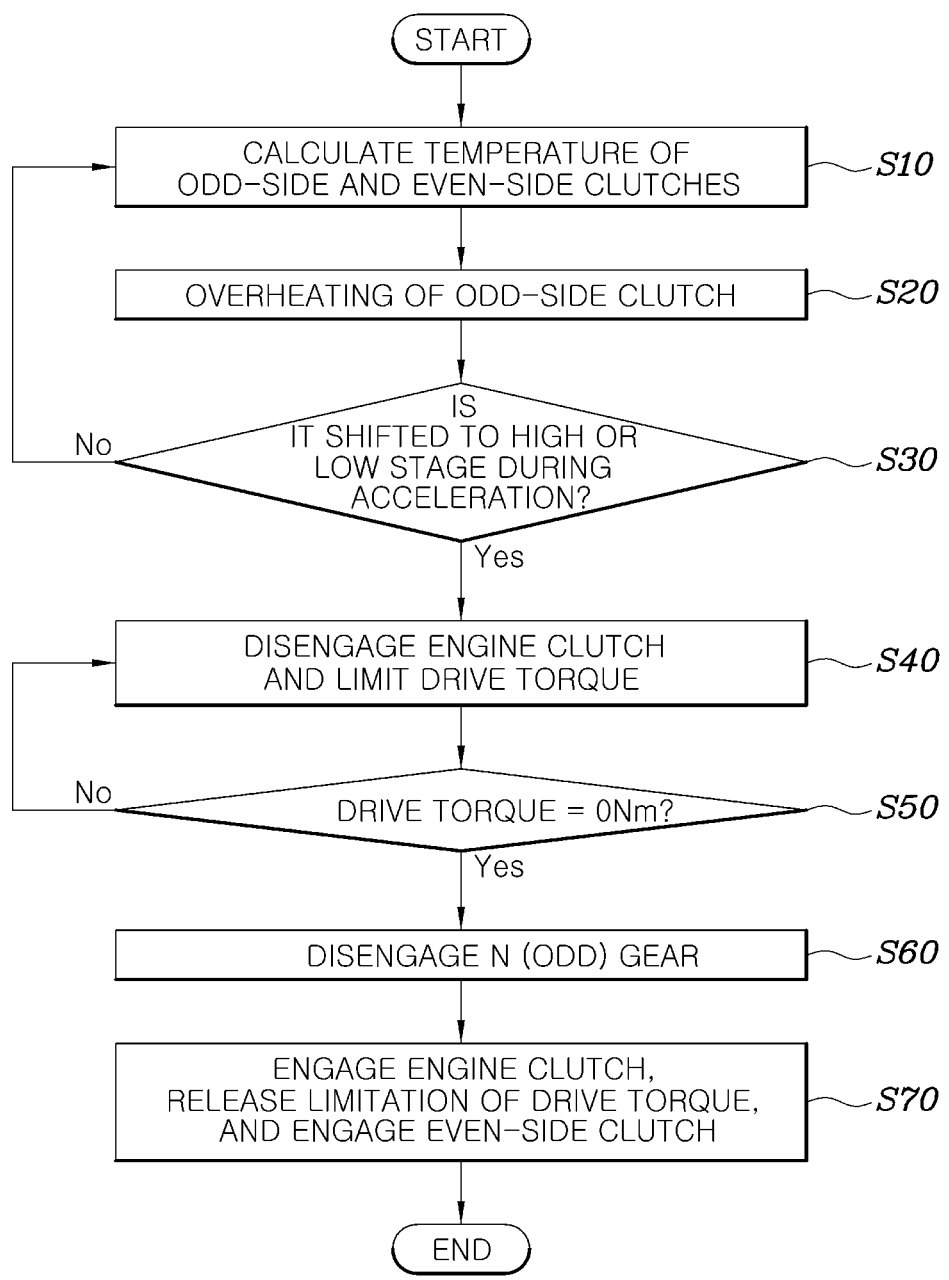
FIG. 2 is a flowchart for explaining a shift control method for a hybrid vehicle with a DCT in one form of the present disclosure.

The shift control method will be described in detail below with reference to FIG. 2. First, in the overheated clutch detection step, a controller may estimate the temperatures of two clutches of a DCT to detect an overheated clutch among them. The controller may be implemented by at least one processor operated by a setting program, in which the setting program includes a series of commands for performing each step included in the control method according to the present disclosure to be described below.

The temperatures of the clutches may be estimated using signals input to an engine, a transmission, and other vehicle controllers while a vehicle is traveling, and may be particularly estimated using various factors, such as a vehicle speed, an amount of slip, a variation of slip, a cumulative time of slip, and a clutch heat capacity, for calculating a change in temperature of the clutch.

In the engine clutch disengagement step, when one of the two clutches CL1, CL2 is overheated, and when a shift command for changing a torque from the overheated clutch to a non-overheated clutch is received, the controller may control the engine clutch to be disengaged. The clutch overheat is determined when a temperature of a clutch exceeds a reference overheating temperature.

In more detail, when one clutch forming a current specific stage is in the overheat state and it is desired to perform shifting to a shift stage which is one-level higher or lower than the current specific stage by a non-overheated clutch, the engine clutch may be disengaged by reducing an engine clutch torque by the operation of a clutch actuator that operates the engine clutch.

In this case, the overheated clutch is controlled to be maintained in the engaged state after the engine clutch disengagement step so that the occurrence of slip of the overheated clutch is suppressed and thus additional increase of the temperature of the overheated clutch is inhibited.

In the gear disengagement step, the controller may control a shift gear, which forms a current shift stage by the overheated clutch, to be disengaged.

For example, in the case where the overheated clutch is an odd-side clutch and the current shift gear formed by the overheated clutch is a third gear, the third gear may be disengaged by the operation of the odd-side gear actuator. In this case, a desired shift gear may be a second or fourth gear, and the desired shift gear may be in an already engaged state according to the control of previous gear engagement before the current shift gear is disengaged.

In the clutch engagement step, the controller controls the non-overheated clutch to be engaged while engaging the engine clutch.

For example, in the clutch engagement step, an increasing gradient (i.e., an increasing slop with a certain degree) of torque of the engine clutch may be controlled to be larger than an increasing gradient of the non-overheated clutch such that the engine clutch is engaged faster than the non-overheated clutch.

Meanwhile, the shift command in the engine clutch disengagement step may be a power-on upshift command for shifting to a high stage by pressing an accelerator pedal, or a power-on downshift command for shifting to a low stage by pressing the accelerator pedal.

Thus, when the shifting to the high or low stage is desired according to the driver's acceleration intention, the drive torque of the drive source may be controlled to be limited in the engine clutch disengagement step.

For example, an engine and a motor may be used in the drive source in the present disclosure, and therefore the engine torque and the motor torque may be controlled to be limited.

In addition, when shifting is desired during acceleration, the drive torque of the drive source may be controlled to be increased by releasing the limitation of the drive torque in the clutch engagement step. That is, it is possible to increase the drive torque by increasing the engine torque or the motor torque.

Meanwhile, in the case of the power-on upshift, the increasing gradient of the drive torque may be controlled to be equal to or smaller than increasing gradient of torque of the non-overheated clutch in the clutch engagement step.

Figure 3:
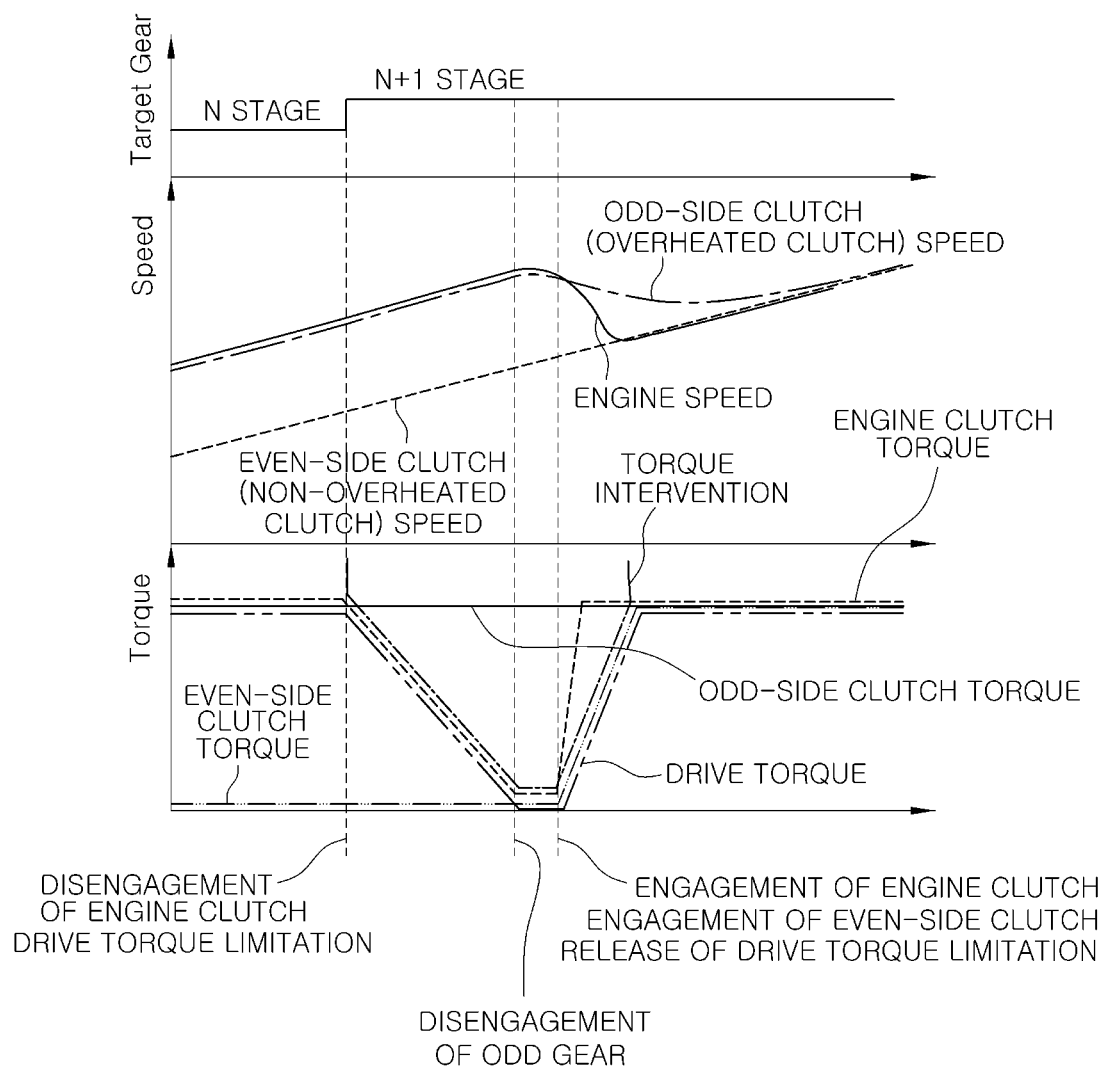
FIG. 3 is a view for explaining an operation state of a drive source and clutches during a power-on upshift in one form of the present disclosure.

That is, the speed of the engine may be controlled to be synchronized faster than the speed of the even-side clutch in the section of actual shifting by controlling the increasing gradient of the drive torque to be equal to or smaller than the increasing gradient of torque of the even-side clutch, thereby improving a shift response, as illustrated in FIG. 3.

In addition, the clutch engagement step may include a first drive torque control step, in which the initial increasing gradient of the drive torque is controlled to be greater than the increasing gradient of torque of the non-overheated clutch and to be equal to or smaller than the increasing gradient of torque of the engine clutch in the power-on downshift, and a second drive torque control step, in which the increasing gradient of the drive torque is controlled to follow the increasing gradient of torque of the non-overheated clutch.

Figure 4:
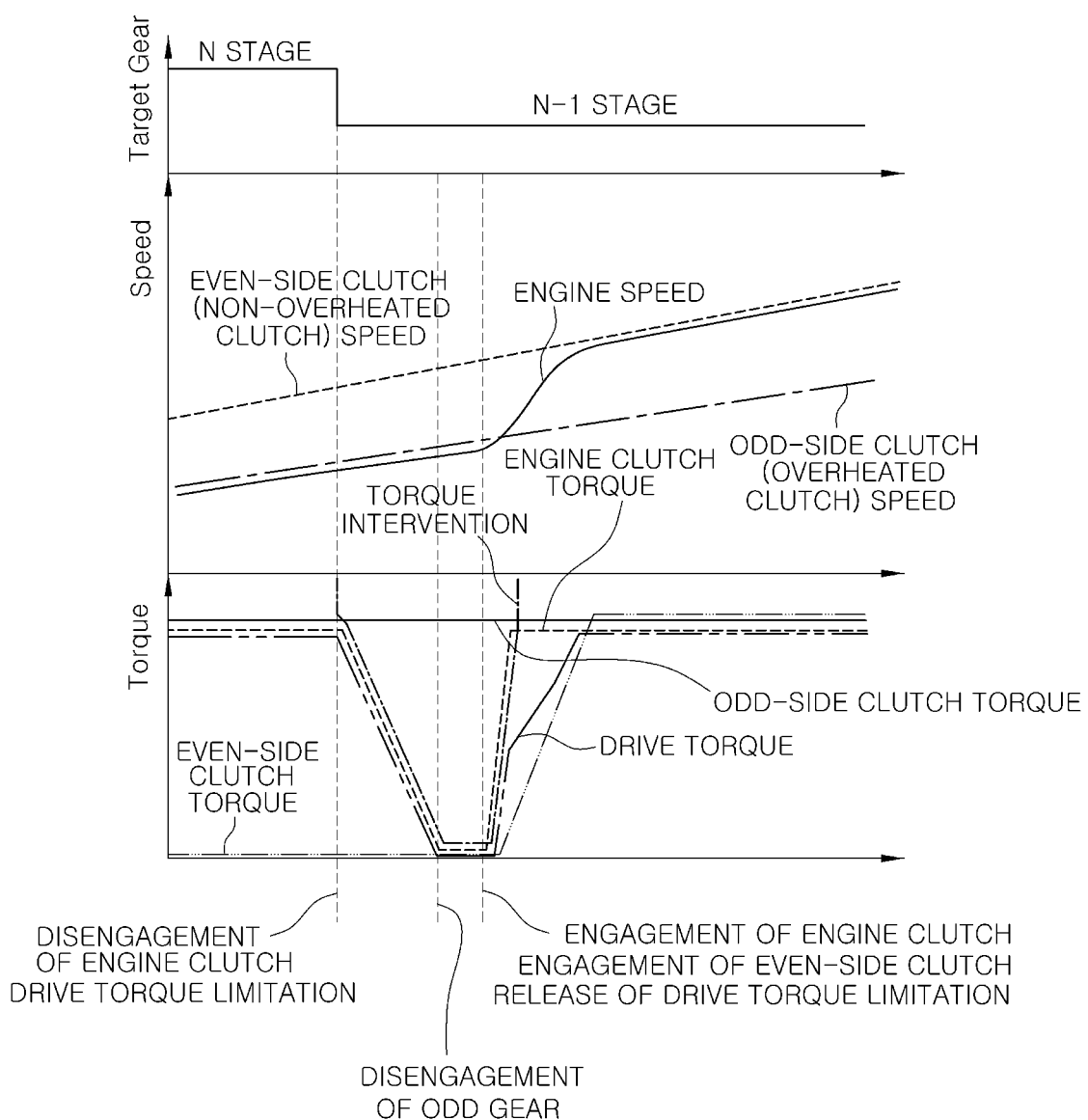
FIG. 4 is a view for explaining an operation state of the drive source and the clutches during a power-on downshift in one form of the present disclosure.

That is, the speed of the engine may be controlled to be instantaneously increased and synchronized faster than the speed of the even-side clutch in the initial section of actual shifting by controlling the increasing gradient of the drive torque to be equal to or greater than the increasing gradient of torque of the non-overheated clutch, thereby improving a shift response, as illustrated in FIG. 4.

However, the initial increasing gradient of the drive torque is controlled to be equal to or less than the increasing gradient of torque of the engine clutch in order to reduce shocks according to the engagement of the engine clutch in the initial section of actual shifting.

In the section after the initial section of actual shifting, the increasing gradient of the drive torque is controlled to gradually follow the increasing gradient of torque of the non-overheated clutch, with the consequence that the speed of the engine is controlled to be smoothly synchronized with the speed of the even-side clutch in the end of the actual shifting section, thereby suppressing shifting shocks of the vehicle.

The control process of the power-on upshift according to the form of the present disclosure will be described below with reference to FIGS. 2 and 3. In the control process, the temperatures of respective clutches connected to two input shafts of the DCT are estimated and calculated while the vehicle is traveling (S10).

When an odd-side clutch is determined to be higher than a reference overheating temperature and be in an overheated state according to the above estimation (S20), and, in this state, a shift command is input for power-on upshift from an N stage as an odd stage to an N+1 stage as an even stage according the driver's acceleration intention (S30), an engine clutch is disengaged while an engine torque and a motor torque are limited (S40).

Next, it is determined whether the engine torque and the motor torque reach zero "0" Nm (S50), and an N gear is disengaged when they reach 0 Nm (S60). In this case, the odd-side clutch is maintained in an engaged state without disengagement.

The engine clutch is engaged while an even-side clutch as a non-overheated clutch is engaged, so that a gear is shifted to the N+1 stage. At the same time, the limitations of the engine and motor torques are released so that a drive torque is transmitted to an output shaft through the even-side clutch and the N+1 stage (S70).

The control process of the power-on downshift according to the form of the present disclosure will be described below with reference to FIGS. 2 and 4. In the control process, the temperatures of respective clutches connected to two input shafts of the DCT are estimated and calculated while the vehicle is traveling (S10).

When an odd-side clutch is determined to be higher than a reference overheating temperature and be in an overheated state according to the above estimation (S20), and, in this state, a shift command is input for power-on downshift from an N stage as an odd stage to an N−1 stage as an even stage according the driver's acceleration intention (S30), an engine clutch is disengaged while an engine torque and a motor torque are limited (S40).

Next, it is determined whether the engine torque and the motor torque reach 0 Nm (S50), and an N gear is disengaged when they reach 0 Nm (S60). In this case, the odd-side clutch is maintained in an engaged state without disengagement.

The engine clutch is engaged while an even-side clutch as a non-overheated clutch is engaged, so that a gear is shifted to the N−1 stage. At the same time, the limitations of the engine and motor torques are released so that a drive torque is transmitted to an output shaft through the even-side clutch and the N−1 stage (S70).

As described above, in the case where it is desired to perform shifting in the state in which one of the two clutches of the DCT is overheated, the double-clutch shifting is performed using the non-overheated clutch and the engine clutch without using the overheated clutch, thereby reducing disharmonic shifting in virtue of a small difference in gear ratio during shifting and thus improving shifting and driving performance In addition, the present disclosure is advantageous in that reversing is possible even when the even-side clutch is overheated for torque transfer to the reverse gear.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A shift control method for a hybrid vehicle with a double clutch transmission (DCT), the method comprising steps of:
   estimating, by a controller, respective temperatures of first and second clutches of a DCT to detect an overheated clutch among the first and second clutches, wherein a temperature of the overheated clutch is equal to or greater than a predetermined temperature;
   controlling, by the controller, an engine clutch to be disengaged when one of the first and second clutches is overheated and when a shift command for shifting from a shift stage associated to the overheated clutch to an another shift stage associated to a non-overheated clutch is received by the controller, wherein a temperature of the non-overheated clutch is less than the predetermined temperature;
   controlling, by the controller, a shift gear to be disengaged when a current shift stage formed by the shift gear is associated with the overheated clutch; and
   controlling, by the controller, the non-overheated clutch to be engaged while the engine clutch is re-engaged after the engine clutch is disengaged in the previous step.

2. The shift control method according to claim 1, wherein the overheated clutch is controlled to be maintained in an engaged state after the step of controlling the engine clutch.

3. The shift control method according to claim 1, wherein, in the step of the controlling the non-overheated clutch, an increasing gradient of torque amount of the engine clutch is controlled to be larger than an increasing gradient of torque amount of the non-overheated clutch.

4. The shift control method according to claim 1, wherein the shift command is a power-on upshift command to shift to a higher stage than a current stage, or a power-on downshift command for shifting to a lower stage than the current stage, by pressing an accelerator pedal;
   a drive torque amount of a drive source is restricted in the step of controlling the engine clutch; and
   the restricted drive torque of the drive source is controlled to be released in the step of controlling the non-overheated clutch, so that the drive torque is increased.

5. The shift control method according to claim 4, wherein, in the step of controlling the non-overheated clutch, an increasing gradient of the drive torque amount is controlled to be equal to or smaller than an increasing gradient of torque amount of the non-overheated clutch in a power-on upshift.

6. The shift control method according to claim 4, wherein the step of controlling the non-overheated clutch comprises:
   controlling an initial increasing gradient of the drive torque amount to be greater than an increasing gradient of torque amount of the non-overheated clutch and to be equal to or smaller than an increasing gradient of torque amount of the engine clutch in a power-on downshift; and controlling the increasing gradient of the drive torque amount to follow the increasing gradient of torque amount of the non-overheated clutch after the controlling the initial increasing gradient of the drive torque amount.

* * * * *